(12) United States Patent
Aguirre Vargas et al.

(10) Patent No.: US 8,969,503 B2
(45) Date of Patent: Mar. 3, 2015

(54) PROCESS FOR PREPARING EPISULFIDE RESINS

(75) Inventors: Fabio Aguirre Vargas, Lake Jackson, TX (US); Raymond J. Thibault, Lake Jackson, TX (US); John Beckerdite, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 185 days.

(21) Appl. No.: 13/497,110

(22) PCT Filed: Sep. 21, 2010

(86) PCT No.: PCT/US2010/049595
§ 371 (c)(1),
(2), (4) Date: Mar. 20, 2012

(87) PCT Pub. No.: WO2011/037892
PCT Pub. Date: Mar. 31, 2011

(65) Prior Publication Data
US 2012/0178852 A1 Jul. 12, 2012

Related U.S. Application Data

(60) Provisional application No. 61/244,672, filed on Sep. 22, 2009.

(51) Int. Cl.
| | | |
|---|---|---|
| C07D 331/02 | (2006.01) |
| C08G 59/14 | (2006.01) |
| C08L 71/00 | (2006.01) |
| C08G 75/06 | (2006.01) |
| C08G 75/08 | (2006.01) |

(52) U.S. Cl.
CPC ............ C08G 75/06 (2013.01); C08G 59/1483 (2013.01); C08G 75/08 (2013.01)
USPC ........... 528/109; 523/466; 523/467; 525/107; 525/109; 525/113; 545/90

(58) Field of Classification Search
None
See application file for complete search history.

(56) References Cited

U.S. PATENT DOCUMENTS

| 3,018,262 | A | | 1/1962 | Schroeder |
| 3,378,522 | A | * | 4/1968 | Martin .......................... 525/534 |
| 3,560,524 | A | | 2/1971 | Clason et al. |
| 4,748,083 | A | * | 5/1988 | Widmer et al. ............... 428/419 |
| 5,405,688 | A | | 4/1995 | Decker et al. |
| 6,153,719 | A | | 11/2000 | Abbey et al. |
| 6,242,083 | B1 | | 6/2001 | McGrail et al. |
| 6,551,711 | B1 | | 4/2003 | Bell et al. |
| 6,572,971 | B2 | | 6/2003 | Martin |
| 6,632,893 | B2 | | 10/2003 | Konarski et al. |
| 6,887,574 | B2 | | 5/2005 | Dean et al. |
| 7,037,958 | B1 | | 5/2006 | Hansen et al. |
| 7,163,973 | B2 | | 1/2007 | Ahsan |
| 2003/0149231 | A1 | * | 8/2003 | Amagai et al. ................. 528/377 |
| 2004/0266956 | A1 | * | 12/2004 | Yamada et al. ............... 525/420 |
| 2005/0171237 | A1 | | 8/2005 | Patel et al. |
| 2006/0293172 | A1 | | 12/2006 | Rubinsztajn et al. |
| 2007/0221890 | A1 | | 9/2007 | Gan |
| 2009/0299030 | A1 | * | 12/2009 | Watanabe et al. ............. 528/374 |

FOREIGN PATENT DOCUMENTS

| JP | 7-196800 A | * | 8/1995 |
| JP | H11140161 | | 5/1999 |
| JP | H11140188 | | 5/1999 |
| JP | 2000007759 | | 1/2000 |
| JP | 2002-179671 A | * | 6/2002 |
| JP | 2002241499 | | 8/2002 |
| JP | 2003-176332 | | 6/2003 |
| WO | 2006/052727 | | 5/2006 |
| WO | WO 2007/052567 A1 | * | 5/2007 |
| WO | 2008/090086 | | 7/2008 |

OTHER PUBLICATIONS

International Search Report from related PCT application PCT/US2010/049595 dated Dec. 20, 2010, 4 pages.
International Preliminary Report on Patentability from related PCT application PCT/US2010/049595 dated Dec. 19, 2011, 14 pages.
Li, et al. "Study on the Synthesis of Thiirane", Journal of Applied Science, vol. 101, 2006, 4023-4027, XP002612816.
Dittmer, "Thiiranes and Thiirenes" Comprehensive Heterocyclic Chemistry, vol. 7, W. Lwowski, Ed., Pergamon, Oxford, Chapter 5.06, 1984, 131-184.
Lee, et al. "Handbook of Epoxy Resins", McGraw-Hill Book Company, New York, 1967, Chapter 2, 17 pages.
Bell, et al. Synthesis and Properties of Epoxy-Episulfide Resins, Angewandte Makromolekulare Chemie, vol. 240, Issue 1,1996, p. 71.
Pham, et al., Ullman's Encyclopedia of Industrial Chemistry, vol. 13, "Epoxy Resins", 2012, 90 pages.
Tsuchida, et al., "A new epoxy/episulfide resin system for coating applications: curing mechanism and properties", International Journal of Adhesion and Adhesives, vol. 20, Issue 6, 2000, 449-456.

* cited by examiner

*Primary Examiner* — Robert Sellers
(74) *Attorney, Agent, or Firm* — Brooks, Cameron & Huebsch, PLLC

(57) ABSTRACT

A process for converting epoxy resin to episulfide resin through reactive melt extrusion of a solid epoxy resin with a sulfur donating compound. The resulting resin provides for an application that utilizes the resulting extruded episulfide resin as a low application temperature resin for powder coatings applications.

12 Claims, 2 Drawing Sheets

PROCESS FOR PREPARING EPISULFIDE RESINS

This application is a National Stage application under 35 U.S.C. 371 of PCT/US2010/049595, filed on Sep. 21, 2010 and published as WO2011/037892 A1 on Mar. 31, 2011; which claims the benefit of U.S. Provisional Application Ser. No. 61/244,672 filed Sep. 22, 2009, the entire contents of which are incorporated herein by reference in its entirety.

BACKGROUND OF THE INVENTION

1. Field of the Invention

The present invention relates to a novel process for preparing episulfide resins via reactive melt extrusion of converted epoxy resins.

2. Description of Background and Related Art

It is known to produce episulfide resins via a solution process by carrying out the reaction of epoxy resins such as for example novolacs and sulfur donating compounds such as for example, thiourea and thiourea-derivatives, potassium thiocyanate, thiocyanate anions with various counter cations including sodium, potassium, Group I elements, Group II elements, and phosphine sulfides for example as described in U.S. Pat. No. 6,551,711.

The episulfide resins are common in industrial applications where a low temperature cure and/or shorter gel times of the resins are needed. Temperature of cure and gel time typically depends on the end use application of the resin. For example marine coatings applications can be cured as low as (about 5° C.) and powder coatings applications may be cured as low as at about 120° C.

However, known processes for making episulfide resins use primarily a solvent-based reaction media as described in JP2001-41458, JP2000007759, JP 11140161, and JP 11140188. A reaction process using a solvent-based reaction media generates volatile organic compound (VOC) waste and takes a substantial amount of time (for example, days at ambient reaction temperatures, hours at temperatures up to 70° C.) for a significant conversion to occur (e.g. greater than 60% conversion). In addition, episulfide resins are known to be less stable (as the episulfide has been described as a complex between sulfur atom and alkenes; see for example, Dittmer, D C., "Thiiranes and Thiirenes" in "Comprehensive Heterocyclic Chemistry", Vol. 7, W. Lwowski, Ed., Pergamon, Oxford, 1984, Ch. 5.06, pp. 131-184) than analogous epoxy resins and hence the episulfide resins have a relative short shelf-life (e.g. less than 1 month).

It is desired to provide a process that eliminates the need for solvent which greatly reduces VOC waste; and a process that addresses the storage stability issue commonly found in handling episulfide resins.

SUMMARY OF THE INVENTION

The present invention provides a process for preparing episulfide resins that uses no solvent which essentially eliminates or greatly reduces VOC waste; and addresses the storage stability issue for handling episulfide resins.

One embodiment of the present invention is directed to a process for preparing an episulfide resin composition including reacting a reaction mixture of at least one epoxy resin with at least one sulfur donating compound; wherein the reaction is carried out by reactive melt extrusion.

One advantage of the process of the present invention is that no solvent is required for epoxy to episulfide conversion. Another advantage of the present process is the ability to carry out the reaction in a melt form wherein the reaction may be completed in a short period of time such as seconds versus hours.

The present invention advantageously provides for a process for producing episulfide resins from the resins' epoxy analogs in a solvent-free reaction media without the aid of or the requirement for a catalyst and without the use of a purification step(s). "Solvent free" herein means no solubilizing compounds (including small molecules and volatile organic compounds that are liquid under ambient conditions) are required to dissolve each reaction component into one liquid phase.

One embodiment of the present invention includes a reactive melt extrusion process to form episulfide resins which is performed neat. In other words, no solvents are necessary for the conversion to occur. Also, this conversion occurs in a much shorter time period (seconds versus hours) allowing for the possibility of forming the episulfide resin immediately prior to use.

Another embodiment of the present invention is directed to a process for preparing an episulfide resin composition including first preparing an advanced epoxy resin and then further reacting the advanced epoxy resin with at least one sulfur donating compound; wherein this further reaction is carried out in the melt phase prior to the discharging it into a cooling drum or belt Baker.

BRIEF DESCRIPTION OF THE DRAWINGS

The following drawing illustrates non-limiting embodiments of the present invention, wherein.

DETAILED DESCRIPTION OF THE INVENTION

Figure 1:
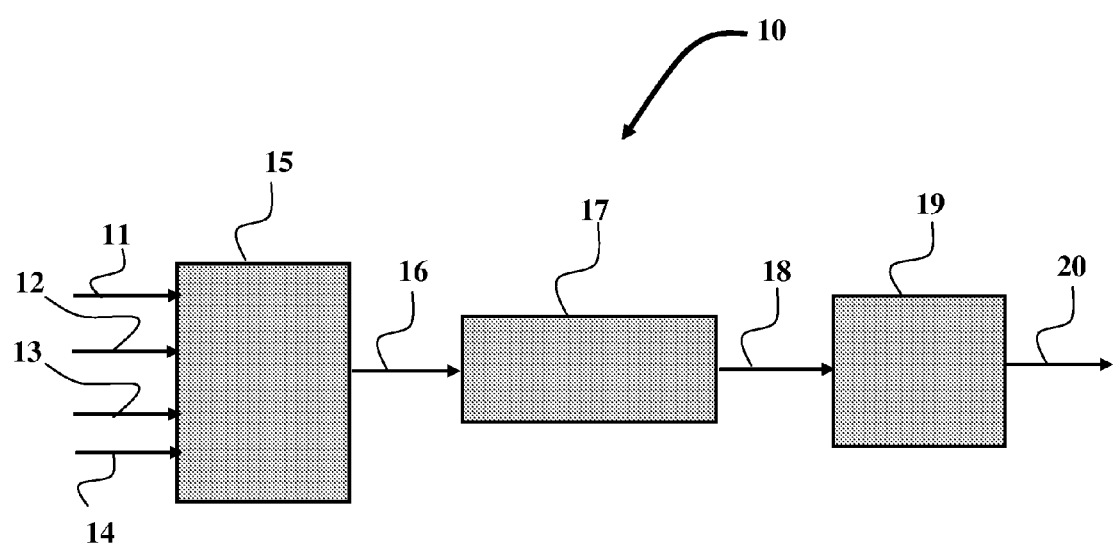
FIG. 1 shows a simplified block flow diagram of the process of the present invention.

In its broadest scope, the present invention process is directed to the conversion of an epoxy ring to a sulfide ring as illustrated below:

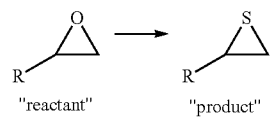

wherein R may be any alkyl, aromatic, cycle, carbocycle, heterocycle atom, and the like.

The conversion of an epoxy ring to an episulfide ring using prior art processes occurs normally in solution which can take hours to complete the reaction, whereas in the present invention, the conversion occurs in a melt and may takes seconds or minutes to complete the reaction.

The process of the present invention advantageously utilizes melt reactive extrusion of a converted epoxy resin with a sulfur-donating compound to form the episulfide resins of the present invention. The process of the present invention has several benefits, including for example: (1) the process uses a "solvent-free" method of transforming a converted epoxy resin to a converted episulfide resin which eliminates VOC waste. (2) Because the present invention process is solvent-free, the process eliminates the risk of VOC exposure. (3) The melt reactive extrusion methodology of the present invention greatly reduces the reaction time for the transformation of a converted epoxy resin to a converted episulfide resin. The melt reactive extrusion methodology of the present invention reduces the conversion time of epoxy to episulfide to minutes as opposed to hours for conventional processes. Reducing epoxy to episulfide conversion time to minutes allows the formation of the episulfide product as needed rather than having to store the episulfide resin product. (4) The formation of a solid episulfide resin may have improved storage stability over a liquid episulfide resin.

The process for producing an episulfide resin composition of the present invention comprises reacting (a) at least one epoxy resin with (b) at least one sulfur-donating compound; wherein the reaction is carried out by reactive melt extrusion.

Component (a) of the present invention may be selected from one or more epoxy resins known in the art. Epoxy resins are those compounds containing at least one vicinal epoxy group. The at least one epoxy resin, component (a), of the present invention may include for example saturated or unsaturated, aliphatic, cycloaliphatic, aromatic or heterocyclic resins; and may substituted or unsubstituted. The epoxy resin may be monomeric or polymeric. An extensive enumeration of epoxy resins useful in the present invention is found in Lee, H. and Neville, K., "Handbook of Epoxy Resins," McGraw-Hill Book Company, New York, 1967, Chapter 2, pages 257-307; incorporated herein by reference.

The epoxy resins, used in embodiments disclosed herein for component (a) of the present invention, may vary and include conventional and commercially available epoxy resins, which may be used alone or in combinations of two or more. In choosing epoxy resins for compositions disclosed herein, consideration should not only be given to properties of the final product, but also to viscosity and other properties that may influence the processing of the resin composition.

Particularly suitable epoxy resins known to the skilled worker are based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins known to the skilled worker include reaction products of epichlorohydrin with o-cresol and, respectively, phenol novolacs. It is also possible to use a mixture of two or more epoxy resins.

The epoxy resins, useful for the preparation of the converted epoxy resins in the present invention, component (a) may be selected from commercially available products. For example, D.E.R. 331, D.E.R. 332, D.E.R. 334, D.E.R. 580, D.E.R. 736, or D.E.R. 732 epoxy resins or D.E.N. 431 or D.E.N. 438 epoxy novolacs available from The Dow Chemical Company may be used. As an illustration of the present invention, the epoxy resin component (a) may be a liquid epoxy resin, D.E.R.® 383 (DGEBA) having an epoxide equivalent weight of 175-185, a viscosity of 9.5 Pa-s and a density of 1.16 gms/cc. Other commercial epoxy resins that can be used for the epoxy resin component can be D.E.R. 330, D.E.R. 354, or D.E.R. 332 epoxy resins. Episulfide resin can be blended with other liquid or solid epoxy resins as described in Bell et al, Synthesis and Properties of Epoxy-Episulfide Resins, Angewandte Makromolekulare Chemie, Vol 240, Issue 1, page 71, for the preparation of converted epoxy resins in the present invention.

Other suitable epoxy resins useful as component (a) are disclosed in, for example, U.S. Pat. Nos. 3,018,262; 7,163, 973; 6,887,574; 6,632,893; 6,242,083; 7,037,958; 6,572,971; 6,153,719; and 5,405,688; PCT Publication WO 2006/052727; and U.S. Patent Application Publication Nos. 20060293172, 20050171237, and 2007/0221890 A1; each of which is hereby incorporated herein by reference.

Although any epoxy resin, including blends of liquid and solid epoxy resins, that is solid at room temperature (i.e., about 25° C.) may be used in the present invention, generally the at least one epoxy resin comprises a solid epoxy resin from a 1.5-type to a 10-type epoxy resin; preferably the epoxy resin may be for example, a 2-type to a 9-type solid epoxy resin; and more preferably the epoxy resin may be for example a 2-type to a 7-type solid epoxy resin, as defined by Pham, H. Q.; Marks, M. J. Epoxy Resins. In Ullmann's Encyclopedia of Industrial Chemistry; Wiley-VCH: Weinheim, 2005; and commercially available from The Dow Chemical Company under its D.E.R® 600 series (trademark of The Dow Chemical Company) epoxy resins. In addition, any epoxy-terminated resin including, but not limited to, "Taffy" epoxy resins; bisphenol F based solid epoxy resins; brominated solid epoxy resins; and oxazolidinone and isocyanurate based epoxy-resins can be utilized in place of or in combination with the DER 600 series epoxy resins. Furthermore, solid and liquid epoxy-functionalized novolacs can also be utilized in the present invention. The novolacs may be used alone or blended with one or more solid epoxy-terminated resins. Additionally, a portion of the terminal epoxy functionality may be reacted with a monofunctional capping agent including for example, but not limited to, an isocyanate or imide capping agent. In general, the choice of the epoxy resin used in the present invention depends on the application. However, diglycidyl ether of bisphenol A (DGEBA) and derivatives thereof are particularly preferred. Other epoxy resins can be selected from but not limited to the groups of: bisphenol F epoxy resins, novolac epoxy resins, glycidylamine-based epoxy resins, alicyclic epoxy resins, linear aliphatic epoxy resins, tetrabromobisphenol A epoxy resins, and combinations thereof. In still another embodiment of the present invention, the epoxy resin used may include an advanced epoxy resin. An "advanced epoxy resin" herein means an epoxy resin that has been reacted with a less-than-stoichiometric-amount of another at least difunctional reactant that results in an increase in the molecular weight of the epoxy resin. For example, any of the aforementioned epoxy resins may be reacted with a difunctional or polyfunctional reactant such as bisphenol A, bisphenol F, isocyanates, phenolic novolac resins to form the advanced epoxy resin. Thus, one embodiment of the process for producing a solid episulfide resin composition includes reacting a reaction mixture of (a) at least one advanced epoxy resin with (b) at least one sulfur donating compound; wherein the reaction is carried out by melt reaction and the sulfur donating compound is introduced into the process after the advanced epoxy resin has reached at least 80% of its target molecular weight but prior to the discharge of the resin from the reactor. Component (b) of the present invention may be selected from one or more sulfur-donating compounds known in the art. "Sulfur-donating compounds" as used herein means those compounds containing at least one sulfur group. The at least one sulfur-donating compound, component (b), of the present invention may include for example thiourea and thiourea-derivatives, alkali metal thiocyanate, phosphine sulfide and phosphine sulfide derivatives; and mixtures thereof. Any liquid or solid sulfur donating species can be utilized for the epoxy to episulfide conversion as well as derivatives thereof. Preferably, thiourea, thiourea derivatives, and potassium thiocyanate are used in the present invention.

In other embodiment, thiocyanate ions (e.g., ammonium thiocyanate) with different counter cations can be utilized to affect conversion.

Miscibility of the sulfur compound (e.g., thiourea) with the epoxy resin is preferred Ammonium thiocyanate ($NH_4SCN$) with larger counter cations are preferred due to its miscibility with the epoxy resin. The range of "miscibility" as used/defined herein is the ability for two materials to mix homogeneously, in the liquid phase, in all proportions.

The amounts of the epoxy resin component (a) and the sulfur-donating component (b) used in the reaction may vary depending on degree of reactivity desired for a particular application. Generally, the molar ratio of sulfur-donating compound to epoxy resin is from about 0.0001 to about 10; preferably from about 0.1 to about 5; and more preferably from about 2 to about 1.

Generally, the number of sulfur equivalents in the sulfur-donating compound equals the number of epoxy equivalents in the epoxy resin in order to convert all epoxy groups into episulfide groups assuming a 100% conversion. The number of epoxy equivalents can exceed the number of sulfur equivalents if partial conversion of epoxy groups is desired for a particular application.

The process for preparing episulfide resin useful in the present invention includes using a melt reaction. As one illustration of the present invention, a melt extruder may be used to melt the solid reactants to allow the melt reaction to take place. The extruder may be selected from any number of well known extruders known in the art, such as for example but not limited to, twin extruders under the tradenames PRISM TSE 16PC and PRISM TSE 36 PC manufactured by Rheology Solutions Pty Ltd; or screw extruders models SLJ-30, SLJ-40, SLJ-58A, SLJ-60, SLJ-70, SLJ-80 manufactured by Donghui Powder Processing Equipment Co. Ltd. Other extruders that may be used in the present invention are extruders similar to the above commercial extruders with at least one temperature zone that can be controlled in the range of 35° C. to 110° C. with an accuracy of at least ±5° C.

In carrying out the process of the present invention, the mixed reactants are fed into the extruder and processed through the extruder from the feed point to the exit point wherein an episulfide resin product exits the extruder. A mixture of the reactants of the present invention preferably admixed together prior to feeding the mixture into the extruder. The mixing may be carried out in any order to provide the resulting product of the present invention. There is no special mixing order when formulating the resin composition of the present invention. Generally, the epoxy resin compound is first dry blended in solid form with the sulfur donating compound; and then the mixed reactants are reactively extruded. Any of the above-mentioned optional assorted formulation additives, for example fillers, may also be added to the composition during the mixing or prior to the mixing to form the composition fed into the extruder.

FIG. 1 shows one illustration of the flow process of the present invention and the apparatus for the present invention process generally indicated by numeral 10. With reference to FIG. 1, there is shown a solid epoxy resin feed stream 11 and a sulfur-donating compound feed stream 12 which are dry mixed in a pre-mixer 15 commonly used in the manufacturing of powder coatings. An optional pigment feed stream 13 and/or an optional extender feed stream 14 may also be dry mixed in the pre-mixer 15 with the epoxy resin feed stream 11 and a sulfur donating compound feed stream 12.

The solid epoxy resin and the sulfur donating compound mixture 16 is then transferred into a twin-screw extruder 17 commonly used in the manufacture of powder coatings. The temperature profile inside the extruder 17 is set to allow the solid epoxy resin to melt and react with the sulfur donating compound. The resulting melted episulfide resin product 18 from the extruder 17 is then cooled down on a melt cooler 19; and then the resulting cooled solid reaction product of an episulfide resin product 20 is ready to be used in an epoxy or hybrid powder coating application. In an alternative embodiment, the resulting episulfide solid resin product 20 may be dissolved in a solvent such as xylene or any other appropriated solvent for use in liquid coatings applications.

All the reactants are typically mixed and passed through the reactor extruder at a temperature enabling the preparation of an episulfide resin product having the desired properties for the desired application. In general, the temperature during the mixing of all reactants and subsequent reaction of the mixture may be at least about 5° C. above the Tg of the epoxy resin reactant component (a); preferably, from about 10° C. above the Tg of the epoxy resin component (a) to 50° C. above the Tg of the epoxy resin component (a); and more preferably, from about 5° C. above the Tg of the epoxy resin component (a) to about 25° C. above the Tg of the epoxy resin component (a). If extruder temperature is at or below the resin Tg the reaction between the solid epoxy resin and the sulfur donating compound is unlikely to occur. If the extruder temperature is more than 50° C. above the resin Tg, the episulfide groups could react further with the secondary OH normally present in the epoxy resin.

The reaction mixture composition in the extruder is reacted at a predetermined temperature and for a predetermined period of time sufficient to react the reactants. For example, the temperature of the extruder to affect the chemical transformation of the reaction mixture may be generally from about 25° C. to about 200° C.; preferably from about 50° C. to about 150° C.; and more preferably from about 80° C. to about 120° C.; and the residence time in the extruder, i.e., the reaction time may be chosen between about 5 seconds to about 10 minutes, preferably between about 1 second to about 1 minute, and more preferably between about 10 seconds to about 15 seconds. Below a period of time of about 1 second, the time may be too short to ensure sufficient reaction under conventional processing conditions; and above about 10 minutes, the time may be too long to avoid the reaction of the episulfide groups with the secondary OH normally present in epoxy resin.

The minimum permissible temperature rage for the reactive extrusion is determined via the glass transition temperature (Tg) of the solid epoxy resin with a maximum temperature of 30° C. above the Tg of the converted solid epoxy resin.

The extrusion time is limited to a maximum of 15 seconds with an ideal range being 10 seconds.

Any by products, such as for example urea, that are formed during the reaction and present in the episulfide resin of the present invention can be removed using known purification procedures to those skilled in the art. In order to remove the stoichiometric by-product resulting after sulfur is transferred to form the episulfide ring; selective precipitation procedures, for example, may be used. For example, the episulfide resin can be dissolved with a solvent or a blend of solvents that selectively dissolves the by-product but not the resin. Alternatively, a solvent or blend of solvents that will selectively dissolve the epoxy resin but not the stoichiometric by-product (urea, for instance) may also be employed.

Figure 2:
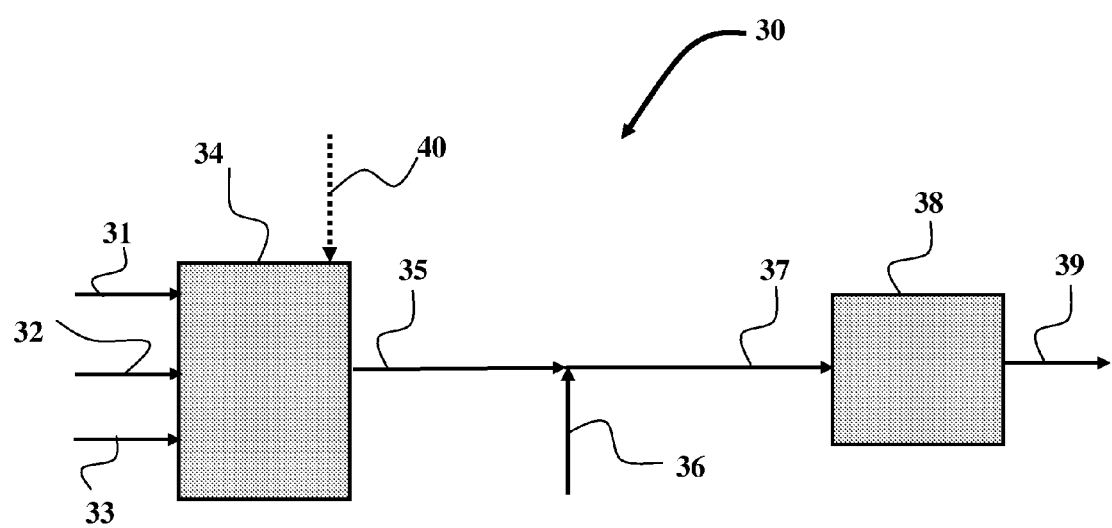
FIG. 2 shows a simplified block flow diagram of another embodiment of the process of the present invention.

With reference to FIG. 2, there is shown an illustration of an alternative process of the present invention and the apparatus for the present invention process generally indicated by numeral 30. In FIG. 2, there is shown a liquid epoxy resin feed stream 31, bisphenol feed stream 32 and catalyst feed stream 33 which is fed into a reactor 34 commonly used in the manufacturing of solid epoxy resins. The resulting product exiting from the reactor 34 as stream 35 is an advanced epoxy resin product 35. The advanced epoxy resin product 35 is combined with a sulfur-donating compound stream 36 to form a melted episulfide resin product stream 37. Alternatively, the sulfur donating compound may be added directly to an advanced epoxy resin in the reactor 34 as indicated by stream 40 (dotted line 40) which then would exit with product stream 35 to form the melted episulfide product stream 37.

The resulting melted episulfide resin product 37 is then fed into a cooling drum or belt Baker 38 to form a resulting cooled solid reaction product of an episulfide resin product 39. The resin product is then ready to be used in an epoxy or hybrid powder coating application. In an alternative embodiment, the resulting episulfide solid resin product 39 may be dissolved in a solvent such as xylene or any other appropriate solvent for use in liquid coatings applications.

As an illustration of one embodiment of the present invention, a 1:1 epoxy:thiourea ratio for example, may be used. One advantage of the present invention is the capability of being able to "tune" the resulting % episulfide ratio from 100% to <5% episulfide functionality by varying the ratio of epoxy to sulfur-donating compound. By "tune" it is meant that, assuming 100% conversion, one can accurately generate the appropriate ratio simply by mixing the appropriate molar ratio of epoxy to sulfur-donating compound.

The resulting % episulfide ratio may also be tuned by varying extrusion temperature. In general, for example, lower temperatures may result in slower conversion times.

The resulting % episulfide ratio may also be tuned by varying extrusion time (higher conversions at longer times). For example, shorter residence times in the extruder may result in lower conversions (shorter reaction times).

The episulfide resin product of the present invention may be for example the thiirane analog of any epoxy resin.

One of the beneficial properties of the episulfide resin product of the present invention includes for example, its stability. A solid episulfide will be more stable than its liquid analog given the phase of matter differences. As for shelf life, the episulfide may be packaged and stored as an epoxy-sulfur donating compound mixture, extruded on demand, then immediately formulated without the need to store the episulfide at all.

"Stability" herein means the episulfide groups do not substantially homo-polymerize or react further at room temperature with the remaining epoxy groups as described by Katsuyuki Tsuchida and James P. Bell International Journal of Adhesion and Adhesives Volume 20, Issue 6, 2000, Pages 449-456 or react further with urea or secondary OH or phenolic OH groups normally present in solid epoxy resin.

The episulfide resin of the present invention may be used as the sole resin to form a matrix in a final formulation; or the episulfide resin may be used as one of the components in a final formulation.

The episulfide resin of the present invention may be used in any application where conventional episulfide resins are used. Some non-limiting examples of applications wherein the episulfide resin of present invention may be used include, for example, solvent borne liquid coatings, powder coatings, electrical laminates, and the like. Preferably, the episulfide resin of the present invention may be used in powder coatings.

As an illustration of one embodiment of the present invention, a powder coating formulation, for example, may be prepared by mixing the episulfide resin of the present invention in solid form with a curing agent like dicyanodiamide (DICY) and/or a phenolic hardener, an accelerator like 2-methyl imidazole or its adducts like EPIKURE® P101; a flow modifier like Modaflow Powder® III and optionally a mineral filler or extender like Minspar® 7.

The concentration of the episulfide resin used in the powder coating formulation of the present invention may range generally from 0.1 wt % to about 95 wt %, preferably from about 5 wt % to about 80 wt %, more preferably from about 20 wt % to about 75 wt %, and most preferably from about 50 wt % to about 65 wt %.

Optional components, that may be useful in the powder coating formulation of the present invention, are components normally used in resin compositions or formulations known to those skilled in the art. For example, the optional components may comprise compounds that can be added to the composition to enhance reaction rate, selectivity of the reaction, and/or catalyst lifetime.

An assortment of optional additives may be added to the powder coating composition of the present invention including for example, other thermosetting resins that are different from the epoxy resin, component (a), catalysts, hardeners (curing agents or crosslinkers), stabilizers, fillers, plasticizers, catalyst de-activators, and the like; and mixtures thereof.

The concentration of the optional additives used in the present invention may range generally from 0 wt % to about 70 wt %, preferably from about 0.1 wt % to about 50 wt %, more preferably from about 1 wt % to about 30 wt %, and most preferably from about 1.5 wt % to about 20 wt %.

The following examples and comparative examples further illustrate the present invention in detail but are not to be construed to limit the scope thereof.

Example 1

Preparation of Solid Episulfide Product 800 g of D.E.R. 664UE solid epoxy resin (available from The Dow Chemical Company) and 67 g of thiourea (Aldrich, >99% purity) were weighed into 1 gallon plastic container. The resulting mixture was then mixed on a Prism Pilot 3 mixer at 2300 rpm for 15 seconds at a constant temperature of 26° C. This mixing process was repeated twice more. The resulting powdery mixture was then introduced into the feeding hopper of a PRISM TSE 24 PC Series Twin Screw Compounder; and the three extruder zones temperatures of the Compounder were set at 30° C., 75° C., 90° C., respectively. The resulting melted compound was transferred into a PRISM Chill Roll at 25° C. and cooled to form a solid reaction product of an episulfide resin. The solid product of episulfide resin was then used for preparing a powder coating.

Example 2

Preparation of Solid Episulfide Product 800 g of D.E.R. 664UE solid epoxy resin and 85 g of potassium thiocyanate (Aldrich, >99% purity) were weighed into 1 gallon plastic container. The resulting mixture was then mixed on a Prism Pilot 3 mixer at 2300 rpm for 15 seconds at a constant temperature of 26° C. This mixing process was repeated twice more. The resulting powdery mixture was then introduced into the feeding hopper of a PRISM TSE 24 PC Series Twin Screw Compounder; and the three extruder zones temperatures of the Compounder were set at 30° C., 75° C., 90° C., respectively. The resulting melted compound was transferred into a PRISM Chill Roll at 25° C. and cooled to form a solid reaction product of an episulfide resin. The solid product of episulfide resin was then used for preparing a powder coating.

Example 3

Preparation of Solid Epoxy Resin Containing Urea 800 g of D.E.R. 664UE solid epoxy resin and 53 g of urea (Aldrich, >99% purity) were weighed into 1 gallon plastic container. The resulting mixture was then mixed on a Prism Pilot 3 mixer at 2300 rpm for 15 seconds at a constant temperature of 26° C. This mixing process was repeated twice more. The resulting powdery mixture was then introduced into the feeding hopper of a PRISM TSE 24 PC Series Twin Screw Compounder; and the three extruder zones temperatures of the Compounder were set at 30° C., 75° C., 90° C., respectively. The resulting melted compound was transferred into a PRISM Chill Roll at 25° C. and cooled to form a solid reaction product of an epoxy resin. The solid product of epoxy resin was then used for preparing a powder coating.

Example 4

Preparation of Formulation 1

A Fusion-Bonded Epoxy coating powder formulation was prepared by compounding 528 g of D.E.R. 664UE solid epoxy resin, 141.5 g of D.E.H. 85 epoxy hardener (phenolic hardener available from The Dow Chemical Company), 10 g of Epicure P-101 (2-methylimidazole adduct with bisphenol A epoxy resin available from Hexion Specialty Chemicals, Inc), 10 g of Modaflow Powder III (flow modifier, ethyl acrylate/2-ethylhexylacrylate copolymer in silica carrier manufactured by Cytec Industries Inc), 310.6 g of Vansil W20 (calcium silicate mineral available from R.T. Vanderbilt Company, Inc.) and 3.0 g of Cab-O-Sil M 5 (colloidal silica available from Cabot Corp.) The resulting powder coating had a gel time (measured according to the CSA Z245.20-02-06 section 12.2) of 39 seconds and Pill-Flow length of 231 mm A steel bar heated at 232° C. was immersed into the resulting coating powder, then allowed to cure for 2 minutes at 232° C. and water quenched for 10 minutes. The resulting Fusion-Bonded Epoxy coating showed good adhesion to the steel substrate as adhesion is defined by CSA Z245.20-02-06 section 12.14.

Example 5

Preparation of Formulation 2

A Fusion-Bonded Epoxy coating powder formulation was prepared by compounding 528.5 g of the solid reaction product of episulfide resin prepared in Example 1, 140.7 g of D.E.H. 85 epoxy hardener, 10 g of Epicure P-101, 10 g of Modaflow Powder III, 310.7 g of Vansil W20 and 3.0 g of Cab-O-Sil M 5. The resulting powder coating had a gel time of 18 seconds and Pill-Flow length of 78 mm.

Example 6

Preparation of Formulation 3

A Fusion-Bonded Epoxy coating powder formulation was prepared by compounding 528.3 g of the solid reaction product of episulfide resin prepared in Example 2, 140.6 g of D.E.H. 85 epoxy hardener, 10 g of Epicure P-101, 10 g of Modaflow Powder III, 310.7 g of Vansil W20 and 3.0 g of Cab-O-Sil M 5. The resulting powder coating had a gel time of 21 seconds and Pill-Flow length of 0 mm.

Example 7

Preparation of Formulation 4

A Fusion-Bonded Epoxy coating powder formulation was prepared by compounding 528.3 g of the solid epoxy resin containing urea prepared in Example 3, 140.8 g of D.E.H. 85 epoxy hardener, 10 g of Epicure P-101, 10 g of Modaflow Powder III, 310.8 g of Vansil W20 and 3.0 g of Cab-O-Sil M 5. The resulting powder coating had a gel time of about 42 minutes and Pill-Flow length of 188 mm.

TABLE I

| | Formulations | | | |
|---|---|---|---|---|
| COMPONENT | Example 4* Formulation 1 (g) | Example 5 Formulation 2 (g) | Example 6 Formulation 3 (g) | Example 7* Formulation 4 (g) |
| DER 664UE | 528 | | | |
| Example 1 | | 528 | | |
| Example 2 | | | 528 | |
| Example 3 | | | | 528 |
| DEH 85 | 141.5 | 141.5 | 140.6 | 140.8 |
| Epikure P101 | 10 | 10 | 10 | 10 |
| Modaflow Powder II | 10 | 10 | 10 | 10 |
| Vansil W-20 | 311 | 311 | 311 | 311 |

*Not an Example of the Present Invention

TABLE II

| | Properties | | | |
|---|---|---|---|---|
| PROPERTY | Example 4* Formulation 1 | Example 5 Formulation 2 | Example 6 Formulation 3 | Example 7* Formulation 4 |
| Gel time | 39 seconds | 18 seconds | 21 seconds | 42 minutes |
| Pill Flow** (mm) | 231 | 78 | 0 | 188 |

*Not an Example of the Present Invention

Table II above describes the formulations and results of Pill Flow and Gel Time tests of episulfide-containing resins. **Pill Flow was measured by pressing the coating powders into 3.175 cm pill using a pill dye and a carver press. Approximately 8 g of powder was pressed at 6100 psi for 5 seconds. The pill was placed on Teflon coated steel panel inclined to 60 degrees in an oven set at 300° F. (149° C.) and equilibrated for 1 hour. The pill was allowed to flow for 10 minutes before removing it from the oven. The length of the flow was measured and recorded minus the diameter of the pill. The results clearly demonstrate the enhanced reactivity of episulfide resins (Formulations 2 and 3) over the control epoxy resin (D.E.R. 664UE solid epoxy resin—Formulation 1). Urea is the by-product of the epoxy-thiourea reaction, therefore D.E.R. 664UE solid epoxy resin that contained urea was utilized as a control (Formulation 4) to ensure that observed increases in reactivity were not due to urea by-product.

What is claimed is:
1. A process for producing an episulfide resin composition comprising melt reacting a solid reaction mixture of (a) at least one epoxy resin in solid form with (b) at least one sulfur donating compound, wherein the sulfur donating compound comprises thiourea; wherein the episulfide resin composition includes both urea and a solid reaction product and is formed by melt reaction.

2. The process of claim 1, wherein the at least one sulfur donating compound is in solid form.

3. The process of claim 1, wherein the reaction is carried out in a melt extruder.

4. The process of claim 1, wherein the at least one epoxy resin is a solid epoxy resin from a 1.5-type to a 10-type epoxy resin.

5. The process of claim 1, wherein the molar ratio of the at least one epoxy resin to the sulfur donating compound is from about 1:0.01 to about 1:1.

6. The process of claim 1, wherein the reaction is carried out at a temperature of from at least about 5° C. above the Tg of the epoxy resin reactant component (a).

7. An episulfide resin composition comprising both a solid reaction product of (a) at least one epoxy resin in solid form with (b) at least one sulfur donating compound without a solvent, wherein the sulfur donating compound comprises thiourea, and a by-product of the sulfur donating compound comprising urea; wherein the episulfide resin composition is formed by reacting through melt extrusion components (a) and (b).

8. The episulfide resin composition product of claim 7 having less than about 1 percent volatile organic compounds (VOCs).

9. The episulfide resin composition product of claim 7 having a chlorine content of less than about 1000 ppm.

10. A powder coating formulation comprising the reaction product of (i) the episulfide resin composition product of claim 7; and (ii) a flow modifier.

11. The powder coating formulation of claim 10, including (iii) a curing agent; (iv) a curing catalyst; (v) a filler; or (vi) a solvent.

12. The episulfide resin composition product of claim 7, wherein the epoxy resin comprises a reaction product of an aromatic bisphenol and epichlorohydrin.

* * * * *